(12) United States Patent
Nye et al.

(10) Patent No.: US 6,454,336 B1
(45) Date of Patent: Sep. 24, 2002

(54) NARROW WIDTH SLIDE-OUT ROOM SUPPORT SYSTEM

(75) Inventors: Timothy L. Nye, Elkhart, IN (US); Robert D. Spore, Rolla, MO (US); Douglas R. Graf, Sussex, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 09/835,251

(22) Filed: Apr. 13, 2001

Related U.S. Application Data

(60) Provisional application No. 60/196,963, filed on Apr. 13, 2000.

(51) Int. Cl.$^7$ .............................................. B60R 27/00
(52) U.S. Cl. ..................... 296/26.13; 296/171; 296/165
(58) Field of Search ........................... 296/26.13, 26.12, 296/26.08, 26.09, 171, 175, 165, 172, 176; 52/67

(56) References Cited

U.S. PATENT DOCUMENTS

| | | | |
|---|---|---|---|
| 2,842,972 A | 7/1958 | Houdart | 74/91 |
| 5,248,180 A * | 9/1993 | Hussaini | 296/171 |
| 5,333,420 A | 8/1994 | Eden | 52/67 |
| 5,491,933 A | 2/1996 | Miller et al. | 52/67 |
| 5,758,918 A | 6/1998 | Schneider et al. | 296/26 |
| 5,833,296 A | 11/1998 | Schneider | 296/26.13 |
| 5,902,001 A | 5/1999 | Schneider | 296/26.13 |
| 5,984,396 A | 11/1999 | Schneider | 296/26.14 |
| 6,109,683 A | 8/2000 | Schneider | 296/171 |
| 6,116,671 A | 9/2000 | Schneider | 296/26.01 |
| 6,234,566 B1 * | 5/2001 | Cyr et al. | 296/171 |

* cited by examiner

Primary Examiner—Joseph D. Pape
(74) Attorney, Agent, or Firm—Quarles & Brady LLP

(57) ABSTRACT

The present invention provides a slide-out support rail, which is particularly adapted for use as a single set of rails, which may be power operated or manually operated. The slide-out support rail system has an inner telescoping rail with a gear rack mounted on top of the upper wall of the inner rail. The teeth of the gear rack face upwardly and mesh with a pinion gear which is journaled relative to the outer rail above the gear rack.

15 Claims, 3 Drawing Sheets

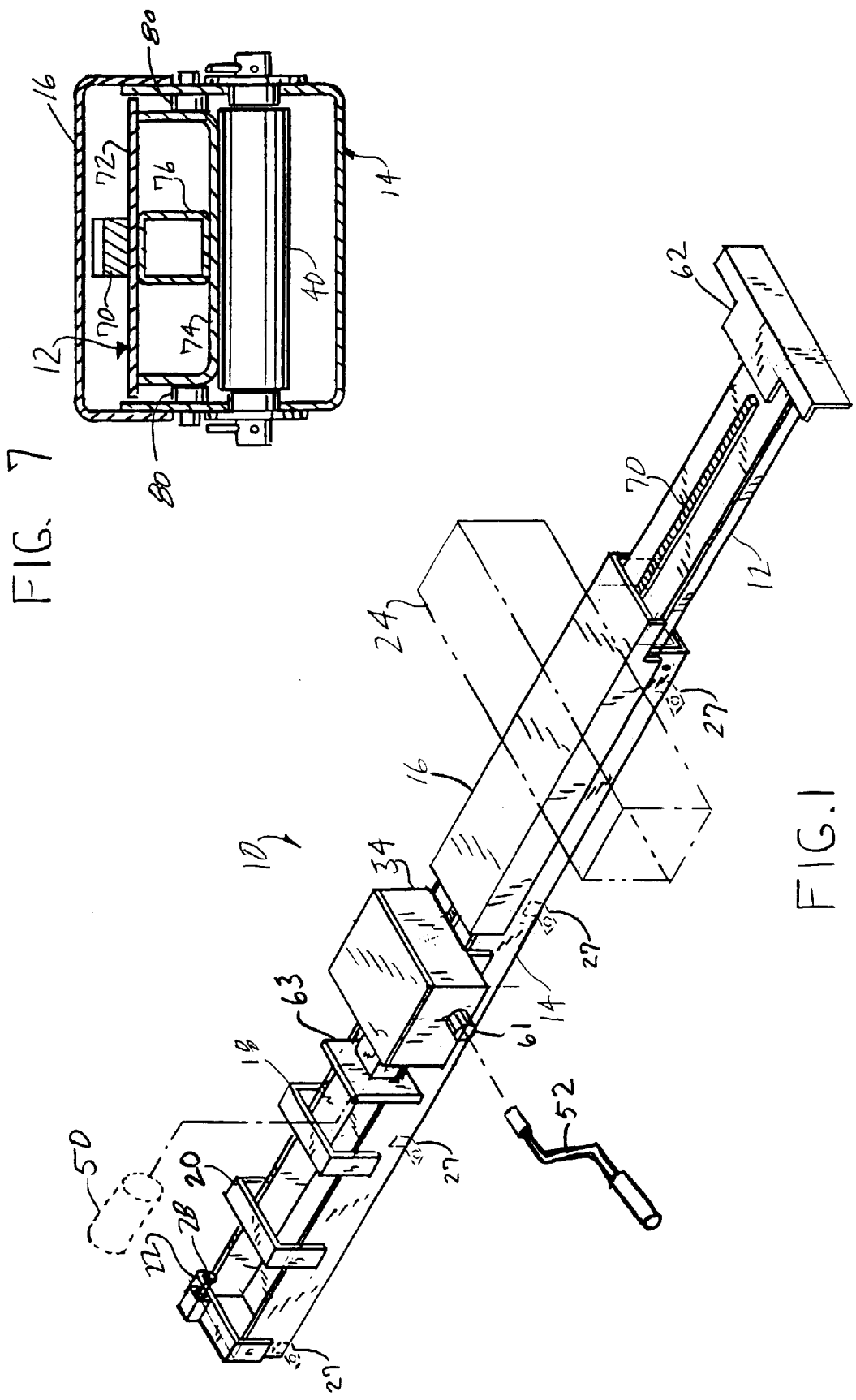

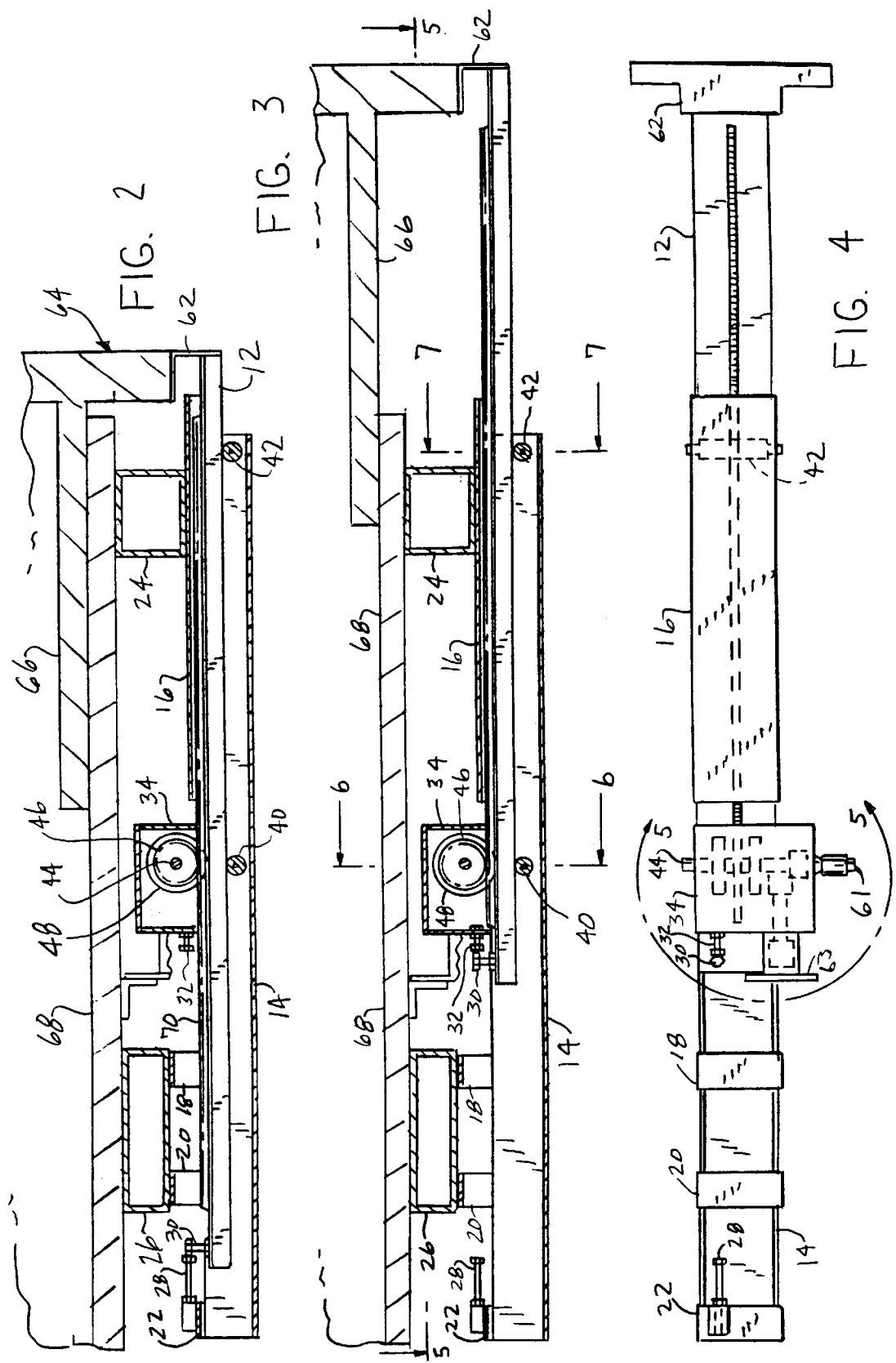

NARROW WIDTH SLIDE-OUT ROOM SUPPORT SYSTEM

CROSS-REFERENCE TO RELATED APPLICATION

This application claims the benefit of U.S. Provisional Application Ser. No. 60/196,963 filed Apr. 13, 2000.

STATEMENT OF FEDERALLY SPONSORED RESEARCH/DEVELOPMENT

Not applicable.

BACKGROUND OF THE INVENTION

1. Field of the Invention

This invention relates to slide-out rooms for recreational vehicles, and particularly to slide-out room support systems in which a single set of rails is required to support the room.

2. Discussion of the Prior Art

In order to increase available interior space of recreational vehicles, e.g. motor homes and trailer homes, slide-out rooms or sections are provided. During transit, these rooms are retracted and stored in the interior of the vehicle or trailer, with the exterior end wall of the slide-out room approximately flush with the adjacent exterior wall of the vehicle or trailer. To use the slide-out room, the vehicle is parked and leveled. The slide-out room is then slid outward from the vehicle using the slide-out room support system thereby increasing the interior space of the vehicle.

The slide-out rooms usually include a floor, a roof, an end wall and one or more side walls. In the retracted position the roof, floor and side walls are typically inside the stationary part of the vehicle, concealed from exterior view, and the room end wall forms a portion of the vehicle's side wall. A gasket is usually provided which is compressed between the inner ends of the slide-out room walls (which may include the floor) and the vehicle walls so as to keep wind, rain, dirt and bugs out when the vehicle is extended. A similar set of gaskets may also be provided between the two outer walls of the respective vehicle and room to seal the room when it is retracted.

Sets of telescoping support rails are usually used to support the slide-out room and these rails may be power driven in and out or manually pulled out and pushed back in. Any number of sets of rails may be used, depending upon the size of the room to be moved.

When two or more sets of rails are used, they are spaced apart and mechanically linked to one another so that they extend or retract together. They may be mechanically linked, for example, with a rack and gear system in which each inner rail is provided with a rack and pinions engaging the racks are connected by a shaft, or with a cable and pulley system, to ensure that the rails extend and retract together.

For small rooms, such as a wardrobe or closet, a single rail is sufficient to support the room and may be all that there is space for. However, a problem with using a single rail is racking of the inner rail relative to the outer rail from side to side. Another problem is providing a single rail with sufficient strength which is still of a low profile to fit in a tight space beneath the room being moved. The present invention provides a solution to these problems.

SUMMARY OF THE INVENTION

The present invention provides a slide-out support rail system that is particularly adapted for use as a single set of rails, which may be power operated or manually operated.

In particular, the invention provides a slide-out support rail system for supporting a slide-out section of a recreational vehicle. The system includes an inner rail mounting a rack on top of a longitudinally extending upper wall so as to mesh with a drive pinion. An outer rail slidably mounts the inner rail on a pair of support rollers spaced apart longitudinally to support the inner rail and maintain engagement of the rack and pinion.

The gear rack of the telescoping inner rail has teeth that face upwardly and mesh with the pinion gear which is journaled relative to the outer rail above the gear rack. Rollers are preferably provided on both sides of the pinion which roll along the top side of the inner rail so as to counteract upward forces exerted upon them, which would otherwise be transferred to the pinion gear. Another set of rollers is also provided at the outer end of the outer rail beneath the inner rail, to support the inner rail.

To assure engagement of the rack with the pinion, the inner rail is made in three pieces, not including the gear rack. As such, the inner rail consists of an open U-channel, which opens upwardly, a rectangular tube approximately centered in the open U-channel, and a top wall plate which covers the tube and extends between the side walls of the U-channel. The rectangular tube is positioned beneath the gear rack, so that the tooth forces exerted on the gear rack by the pinion, which tend to push the gear rack away from the pinion, are counteracted not only by the U-channel and the top plate, but also by the rectangular tube within the U-channel.

In addition, directly beneath the pinion gear which drives the gear rack, another roller is provided, to maintain the gear rack in meshing engagement with the pinion.

In another aspect, the inner rail is made at least two times as wide as it is tall. This improves the resistance to racking of the inner rail.

In addition, between the sidewalls of the outer rail and the sidewalls of the inner rail, wear pads are preferably provided, which also contribute to the resistance to racking of the entire unit.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 1 is a perspective view of a set of slide-out support rails of the invention;

FIG. 2 is a longitudinal cross-sectional view of the rails of FIG. 1 mounted in a recreational vehicle so as to move a room in and out;

FIG. 3 is similar to FIG. 2 but shown with the room extended;

FIG. 4 is a top plan view of the rails of FIG. 1;

FIG. 7 is a partial cross-sectional view from the plane of the line 7—7 of FIG. 3.

DETAILED DESCRIPTION OF THE PREFERRED EMBODIMENT

Figure 5:
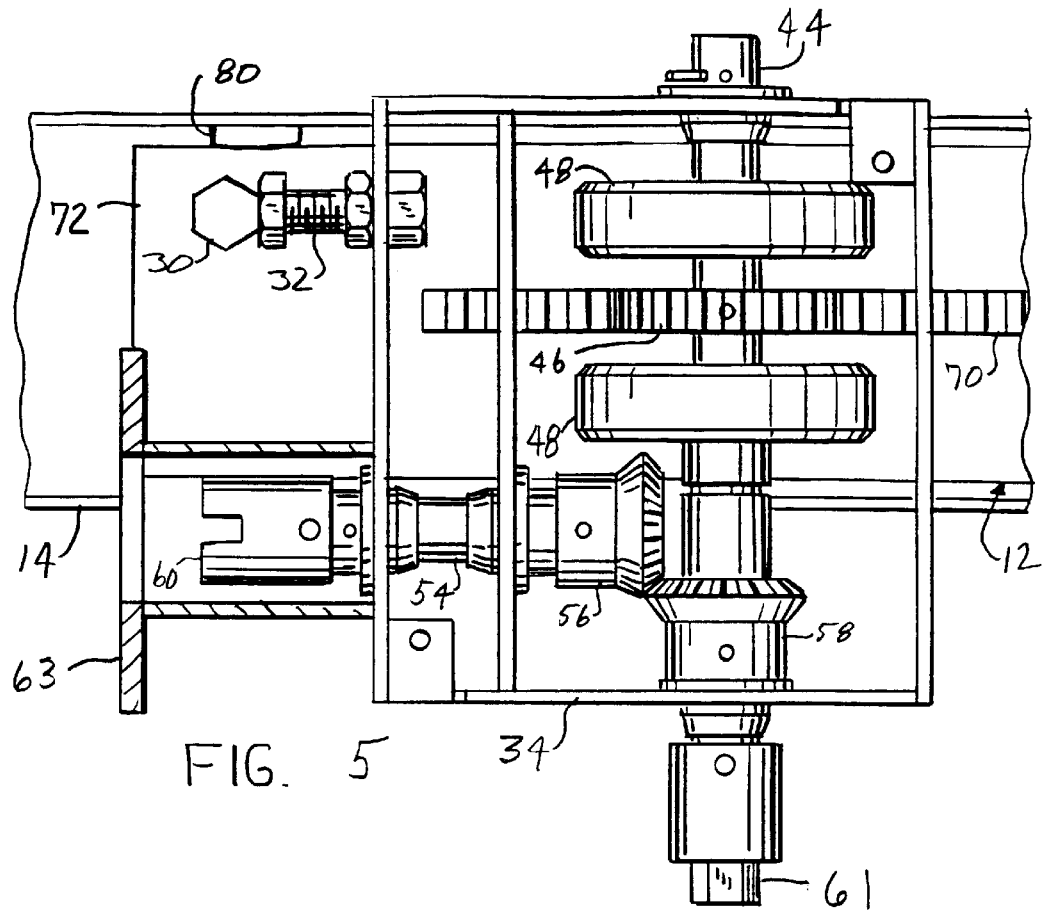
FIG. 5 is a fragmentary detail view showing the drive system for the rails of FIG. 1.

Referring to FIG. 1, a set of slide-out rails 10 of the invention includes an inner rail 12 and an outer rail 14. The outer rail 14 is an upwardly open U-shaped channel with a forward cover 16 welded to it covering its forward portion and straps 18, 20 and 22 welded to it in its rear portion. Cover 16 is welded or otherwise suitably affixed to frame member 24 of the vehicle and straps 18 and 20 are welded or otherwise suitably affixed to frame member 26 (FIG. 2) of the vehicle. Alternatively, right angle tabs 27 could be welded onto both sides of the rail 14 and the tabs bolted to the stationary floor 68, on top of the floor 68, and the movable floor 66 provided above the unit 10. In such a case, the floor 66 is elevated above the floor 68, but this is commonly done, for example, for a slide-out bedroom.

An adjustable stop 28 in the form of a threaded bolt is affixed to the rearward most strap 22. Another bolt 30 is screwed into the rearward end of the inner rail 12 which abuts the bolt 28 in the fully retracted position. Another adjustable stop 32 in the form of a bolt is screwed into drive housing 34 which is welded or otherwise suitably affixed to the outer rail 14. The bolt 30 abuts the adjustable stop 32 in the fully extended position as shown in FIG. 3.

Figure 6:
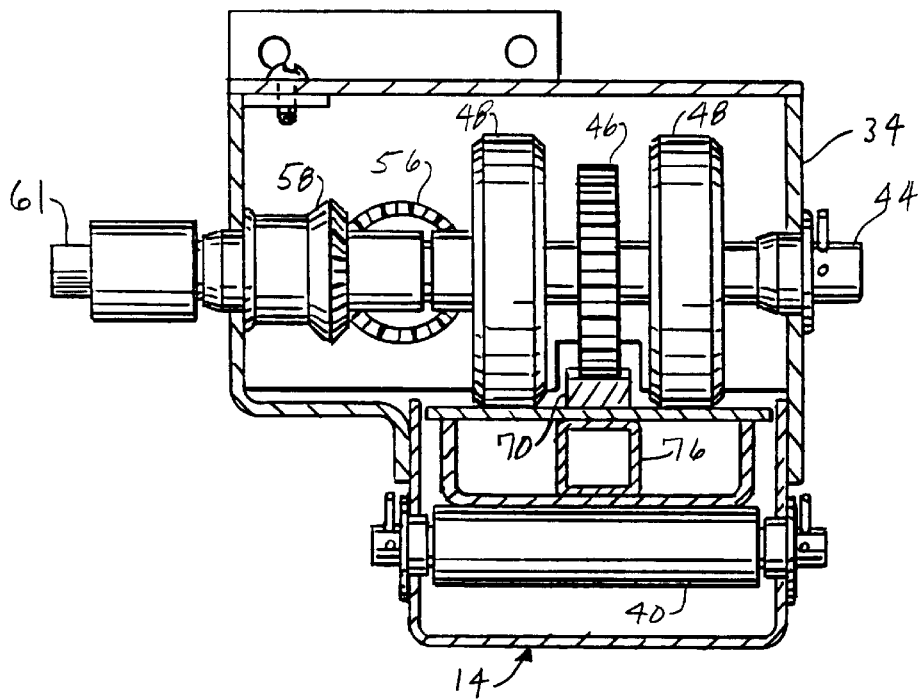
FIG. 6 is a partial cross-sectional view from the plane of the line 6—6 of FIG. 3.

The inner rail 12 is supported in the outer rail 14 by two sets of rollers 40 and 42. Both sets of rollers 40, 42 span the outer rail 14 and are supported thereby by appropriate bearings. The roller 42 is provided at the outward end of the rail 14 and the roller 40 is provided directly beneath the axle 44 on which the drive gear 46 and rollers 48 (FIGS. 5 and 6) are mounted. The shaft 44 is journaled in the drive housing 34 with rollers 48 rotatable relative to the shaft 44 and the gear 46 affixed to the shaft 44 to rotate therewith. Shaft 44 may be turned by an electric motor 50 or by a manual crank 52. Motor 50 is mounted to flange 63 and has its shaft engaged with shaft 54 coupler 60 to turn shaft 54 and therefore bevel gear 56, which meshes with bevel gear 58 which is affixed to the shaft 44. Shaft 54 is also journaled to the housing 34. Coupler 61 on the end of shaft 44 is engagable by the handle 52. Referring particularly to FIGS. 2 and 3, a bracket 62 on the end of the inner rail 12 is affixed to the slide-out room 64, the room 64 having floor 66 which rides on top of stationary floor 68.

Gear 46 meshes with rack 70 which is welded or otherwise suitably affixed to top wall 72 of inner beam 12. Inner beam 12 also includes U-shaped channel 74 which is welded to the top wall 72 and rectangular stiffening tube 76, which is also welded to the channel 74 and/or the top wall 72 directly beneath the rack 70. The tube 76 provides stiffness to keep the rack 70 from bowing away from the gear 46. The roller 40 also supports the rack 70 to keep it in engagement with the gear 46.

Referring to FIG. 7, wear pads 80 which may be made of a lubricious plastic such as nylon or Teflon are provided at positions spaced along the length of the outer rail 14 between the inner rail 12 and the outer rail 14 so as to guide the rail 12 inside the rail 14. The pads 80 help counteract racking side to side of the rail 12 inside the rail 14, which is important since the rails 12 and 14 may be the only set of rails supporting the room 64. The low profile of the rail 12 creates a short and wide profile which has a high transverse bending strength. The rack 70 and tube 76 contribute, along with the members 72 and 74, to the ability of the inner rail 12 to support the weight of the room 64.

Thus, in a slide-out system of the invention, the rack is affixed to the top of the inner rail, and a pinion gear in meshing engagement above the rack drives the inner rail in and out. A roller is provided on each side of the rack, preferably on the shaft of the pinion gear. In a preferred aspect, the inner rail is made relatively short and wide, for example at least two, and preferably closer to at least three, times as wide as it is tall. The rack is centered on the top wall of the inner rail, and a reinforcement is provided below the top wall directly beneath the rack, to maintain engagement of the rack with the pinion. A support roller is provided beneath the bottom wall of the inner rail, directly below the pinion, to support the inner rail and rack in engagement with the pinion.

The low profile of the inner rail contributes to its ability to resist racking, fit a small vertical space, and by itself support a small room. Wear pads affixed to the outer rail between the sides of the inner and outer rails are spaced along the length of the rails for guidance against racking of the inner rail inside of the outer rail.

Many modifications and variations to the preferred embodiment described will be apparent to those skilled in the art. Therefore the invention should not be limited to the embodiment described. Rather, the following claims should be referenced to determine the scope of the invention.

What is claimed is:

1. A slide-out support rail system for supporting a slide-out section of a recreational vehicle, comprising:

an inner rail fixed to said slide-out section to extend and retract said slide-out section, said inner rail mounting a rack on an upwardly facing surface of a longitudinally extending upper wall of said inner rail;

a pinion above said rack in meshing engagement with said rack; and an outer rail slidably mounting the inner rail on support rollers spaced apart longitudinally beneath said inner rail to support the inner rail and maintain engagement of the rack and pinion.

2. The rail system of claim 1, further comprising a pair of drive rollers positioned on opposite sides of the drive pinion contacting the upper wall on each side of the rack.

3. The rail system of claim 2, wherein the inner rail includes a stiffening member mounted to the underside of the upper wall beneath the rack.

4. The rail system of claim 3, wherein the inner rail further includes a U-channel opening upward and capped by the upper wall.

5. The rail system of claim 4, wherein the stiffening member is tubular.

6. The rail system of claim 5, wherein one support roller is directly beneath the pinion and one support roller is proximate a forward end of the outer rail.

7. The rail system of claim 6, wherein the outer rail is a U-channel opening upwardly.

8. The rail system of claim 7, further comprising wear pads between side walls of the inner rail and side walls of the outer rail.

9. The rail system of claim 8, further comprising a cover welded to a forward portion of the outer rail and one or more straps welded to a rear portion of the outer rail.

10. The rail of claim 1, further comprising an adjustable stop mounted to the outer rail to extend longitudinally forward and positioned to contact the inner rail.

11. The rail of claim 10, further comprising a second adjustable stop mounted to the inner rail to extend longitudinally rearward to contact the adjustable stop of the outer rail.

12. The rail of claim 1, further comprising a drive axle mounting the pinion.

13. The rail of claim 11, wherein the drive axle is power driven.

14. The rail of claim 1, wherein the inner rail is at least two times as wide as it is tall.

15. The rail of claim 1, wherein the inner rail is supported by two sets of support rollers, one set directly beneath the pinion and one set at a forward end of the outer rail.

* * * * *